Patented Aug. 5, 1924.

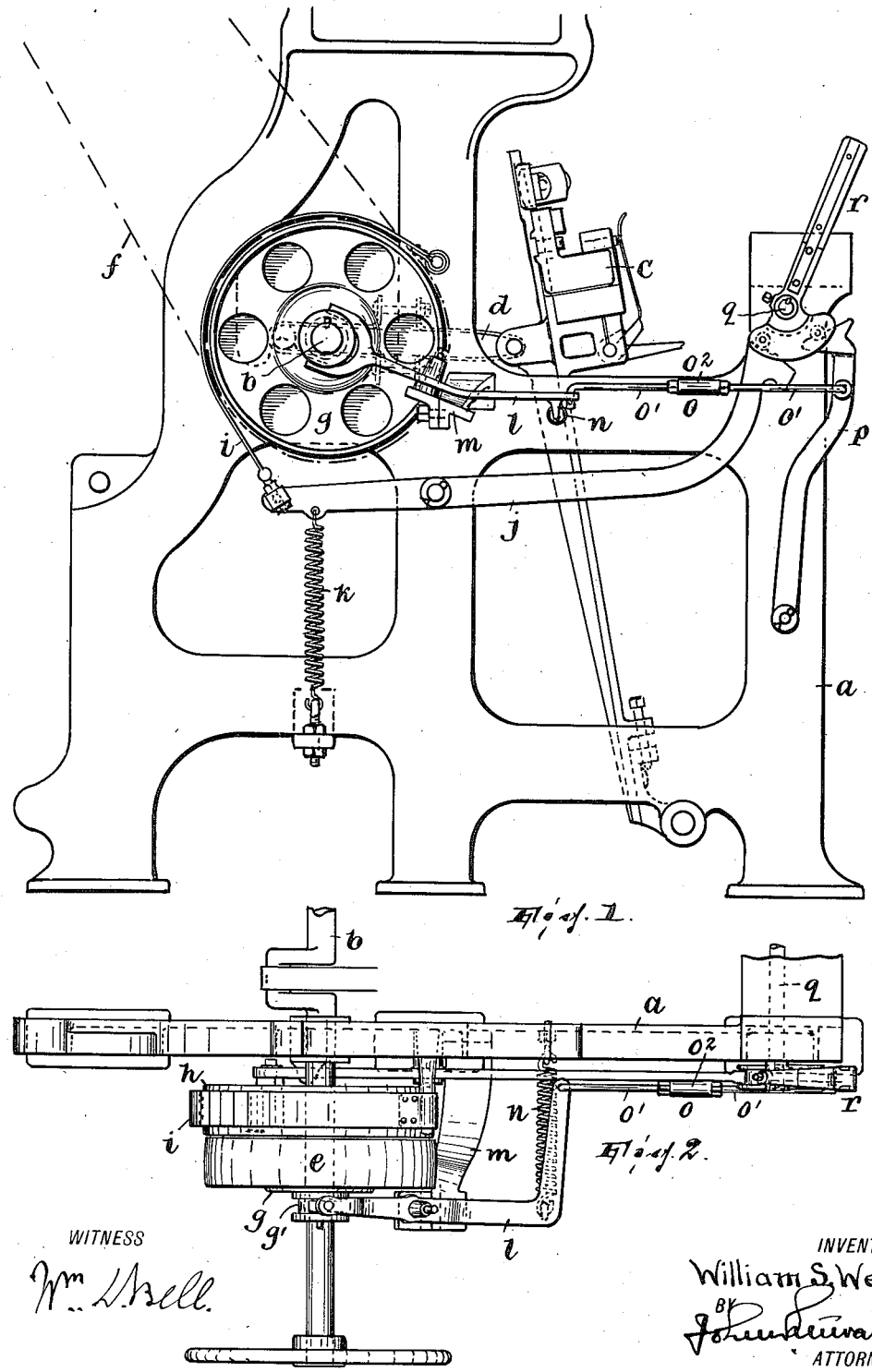

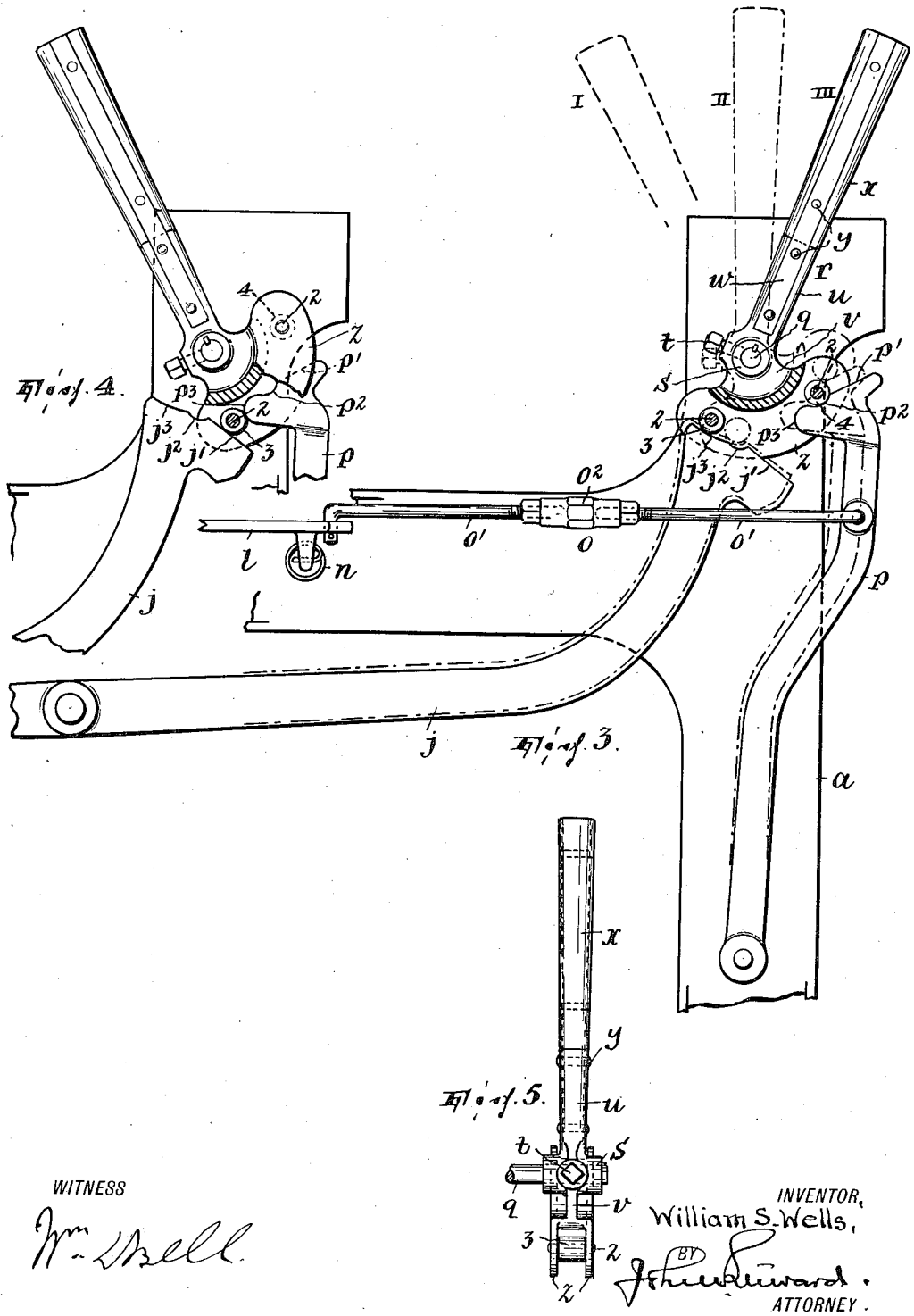

1,503,524

UNITED STATES PATENT OFFICE.

WILLIAM S. WELLS, OF SOUTH BETHLEHEM, PENNSYLVANIA, ASSIGNOR TO BENJAMIN EASTWOOD COMPANY, OF PATERSON, NEW JERSEY, A CORPORATION OF NEW JERSEY.

CONTROLLER FOR LOOMS.

Application filed January 10, 1923. Serial No. 611,722.

*To all whom it may concern:*

Be it known that I, WILLIAM S. WELLS, a citizen of the United States, residing at South Bethlehem, in the county of Lehigh and State of Pennsylvania, have invented certain new and useful Improvements in Controllers for Looms, of which the following is a specification.

The usual means for controlling the running of a loom includes two handles or controllers, one for the brake and the other for the power. They are arranged so that when one is moved in one direction it shifts the other with it in the same direction, and vice versa when the latter is moved in the opposite direction. Thus, to stop the loom the operator moves the brake lever to braking position, which shifts the power lever to the off position, and to start the loom the operator moves the power lever to starting position which shifts the brake lever to off position; if, the loom being stopped, the operator desires simply to turn the loom over by hand he moves the brake lever to the off position, leaving the power lever remaining in the off position.

One of the principal objects of this invention is to simplify the construction of the handle- or controller-including mechanism and also facilitate the control of a loom by providing only one handle or controller.

Another object is to construct said mechanism so that it will be better adapted to resist wear and tear and particularly the breakage which is incident to the operation of the handles in the controlling mechanisms heretofore used.

In the drawings,

Fig. 1 is a side elevation of a loom embodying the invention;

Fig. 2 is a plan of so much thereof as includes the invention;

Fig. 3 is a side elevation on a larger scale and partly in section of the handle or controller and certain other parts in the same positions as in Fig. 1, to wit, the brake being off and the power applied;

Fig. 4 is a similar view in the positions where the brake is applied and the power is off; and Fig. 5 is a rear elevation of the handle or controller.

The loom frame $a$; crank-shaft $b$; lay or batten structure $c$ connected with the crank-shaft by the pitman $d$; the driving pulley $e$ free to rotate on said shaft, and the belt $f$ therefor; the clutch member $g$ coactive with a part of pulley $e$ as a clutch member and splined on said shaft; the brake pulley or wheel $h$ fixed on the shaft and the brake-band $i$ coactive therewith are or may be all the same as usual.

$j$ is a lever fulcrumed in the frame between its ends and which at its rear end is attached to the free end of the brake-band $i$ (whose other end is attached to the frame), being normally urged by a spring $k$ to tighten the band and thus apply the brake. It has its forward end upturned and provided with an incline or cam surface $j'$ and at the crest of such incline a notch $j^2$ and a curved recess $j^3$ concentric to $q$. In the peripheral groove $g'$ of the hub of clutch member $g$ is engaged the rear end of a bell-crank lever $l$ fulcrumed on an arm $m$ projecting from the frame, the free end portion of the lever being connected with the frame by a spring $n$ which normally acts to hold clutch member $g$ withdrawn from the complementary clutch member. Connected to the free end of lever $l$ is a link $o$ including two rods $o'$ connected by a turn-buckle $o^2$ (so that the link can be altered in length) and which is in turn connected to a lever $p$ fulcrumed in the frame. Lever $p$ has an incline or cam surface $p'$ at its upper end arranged reversely to incline $j'$ of lever $j$ and at the crest of said incline or cam surface a notch $p^2$ and an inward nose $p^3$.

$q$ is the controlling shaft of the loom. On this shaft is arranged a controller or handle generally denoted by $r$ and in the form of a lever constructed preferably as follows: There is a boss $s$ which receives shaft $q$ and is affixed thereon by the set-screw $t$ and which has a socket shank $u$ projecting upwardly and a web $v$ projecting downwardly therefrom. The shank has longitudinal opposite grooves receiving metal strips $w$ which are inset in longitudinal grooves in the opposite sides of the handle proper $x$ (which is of wood or other suitable material of light weight), the strips being secured to the shank and handle proper by rivets $y$; the handle is preferably set in the socket of the shank. The casting including boss $s$, shank $u$ and web $v$ also includes a pair of arcuate spaced ribs or flanges $z$ which project downwardly from the web, being connected by pins 2 on which are rollers 3 and 4. This construction of handle or controller gives it great strength with a desirable lightness in the portion $u$ $x$; thus the handle is not apt to break off—a fault frequently occurring in the case of the ordinary handles when they are allowed to shift under spring tension to one limit of motion, due in part to the handles proper thereof representing considerable mass and consequent inertia. The fork formed by the ribs or flanges $z$ receives the free ends of the levers $j$ and $p$, as shown in Figs. 3 and 4.

Three positions of handles $r$—I, II and III—are indicated in Fig. 3, being the "off" position, where the power is off and the brake applied; the "neutral" position, where the power and brake are both off and the loom may be turned over by hand; and the "on" position, where the power is applied and the brake is off.

In position I (see also Fig. 4), handle $r$ has its roller 3 clamped between the levers $j$ and $p$—specifically, between incline $j'$ and nose $p^3$; spring $n$ is holding lever $p$ in the idle position (the clutch $q'$ withdrawn) and spring $k$ is holding lever $j$ in the active position (the brake being applied). Each incline or cam surface $j'$ $p'$ is the tangent of a circle whose center is the axis of $q$; but the relations of 3 to $j'$ and 4 to $p'$ are such that when the handle is turned clockwise 3 passes the crest of $j'$ before 4 passes the crest of $p'$, and so lever $j$ is moved to idle position before lever $p$ is moved to working position, whereby the brake is released before the power is applied, the handle being adapted to be held in the new position (neutral position II) by the entry of roller 3 into notch $j^2$. When the handle $r$ is further turned clockwise, roller 4 proceeds to the crest of incline $p'$ and so moves lever $p$ to active position (where the power is applied), but lever $j$ remains substantially as before because $j^3$ is concentric to $q$, and when handle $r$ assumes the "on" position, III, the parts are held in that position by the entry of 4 into notch $p^2$. The return movement results of course in reversal of these operations. Notch $j^2$ is deep enough to hold the handle securely when in the neutral position; but not so deep but that, if desired, the handle can be moved from position I to position III without appreciable pause at position II.

In the return movement from position III to position I first spring $n$ and then spring $k$ becomes effective to throw the handle toward position I; in a portion of the stroke they are both acting to impel the handle, but at the end roller 3 is impelled by lever $j$ against lever $p$ (at nose $p^3$) and the handle is brought to a stop cushioned by the spring ($n$) active upon lever $p$. Thus lever $p$ affords a cushioned stop to the movement of the handle toward the off position, a feature which is novel in these mechanisms and further contributes to avoiding breakage of handles; it also of course yieldingly opposes any movement of the handle whereby 4 presses against $p'$.

With the handle in position II the weaver can move it toward position III into engagement with lever $p$ and then more or less soon thereafter return it so as to turn the loom over by power through a fraction of a cycle of any desired extent. This is practically impossible with the double-handle mechanism heretofore used, and in any event the use of both hands is in that case required.

Having thus fully described my invention, what I claim as new and desire to secure by Letters Patent is:—

1. A mechanism of the class described including a braking means and a power-controlling means each movable back and forth from one to the other of the on and off positions and one yieldingly held in one and the other yieldingly held in the other of said positions, and a unitary handle movable back and forth and on movement in one direction being adapted to shift each of said means from the position in which it is yieldingly held to the other of said positions, each of the first two means being yieldingly held, independently of the handle, in its said position.

2. A mechanism of the class described including a braking means normally held in the on position but movable therefrom and a power-controlling means normally held in the off position but movable therefrom, and a unitary handle movable back and forth and having means, on movement thereof in one direction, to move the braking means from its said position and thereafter the power-controlling means from its said position.

3. A mechanism of the class described including a braking means and a power-controlling means each movable back and forth from one to the other of the on and off positions and the former being yieldingly held in the on position and the latter yieldingly held in the off position, and a unitary handle movable back and forth and on movement in one direction adapted to shift the braking means to the off position and thereafter the power-controlling means to the on position, said mechanism also including means to oppose movement of the handle in the other direction on said shifting of the braking means but before said shifting of the power-controlling means.

4. A mechanism of the class described including a braking means yieldingly held in the on position, manual control means movable back and forth, one of said means having a surface affording running contact to the other during the movement of the control means in one direction and adapted during a part of such movement to cam said braking means out of said position and during a succeeding part of such movement to maintain said braking means a substantially fixed distance from its braking position, and power-controlling means occupying the off position thereof and arranged to be moved to the on position by said manual control means when the latter is undergoing the second-named part of said movement.

5. A mechanism of the class described including a braking means yieldingly held in the on position, manual control means movable back and forth, one of said means having a surface affording running contact to the other during the movement of the control means in one direction and adapted during a part of such movement to cam said braking means out of said position and during a succeeding part of such movement to maintain said braking means a substantially fixed distance from its braking position, and power-controlling means yieldingly held in the off position thereof and arranged to be moved to the on position by said manual control means when the latter is undergoing the second-named part of said movement.

6. A mechanism of the class described including a braking means yieldingly held in the on position, manual control means movable back and forth, one of said means having a surface affording running contact to the other during the movement of the control means in one direction and adapted during a part of such movement to cam said braking means out of said position and during a succeeding part of such movement to maintain said braking means a substantially fixed distance from its braking position, and power-controlling means yieldingly held in the off position thereof and arranged to be moved to the on position by said manual control means when the latter is undergoing the second-named part of said movement, said mechanism also including means, on the power-controlling means being thus moved to the on position, to oppose return movement of said manual control means.

7. A mechanism to control the running of a driven element including a controlling member movable back and forth from one to the other of the on and off positions and spring-held in but yieldable from one of said positions, and a handle movable back and forth and having means when moved in one direction to move said member from the latter to the other position and when moved in the other direction to impinge against said member in the direction to tension the spring.

8. A mechanism of the class described including a brake-controlling member and a power-controlling member, one spring-held in the on position and the other spring-held in the off position and each movable out of its said position away from the other, and a back-and-forth movable handle having a part thereof interposed between said members, said handle being movable in one direction against said members to force them apart.

In testimony whereof I affix my signature.

WILLIAM S. WELLS.